(12) United States Patent
Ruetenik

(10) Patent No.: US 9,055,732 B1
(45) Date of Patent: Jun. 16, 2015

(54) EQUINE ICE BOOT

(71) Applicant: Monty L. Ruetenik, Clear Lake City, TX (US)

(72) Inventor: Monty L. Ruetenik, Clear Lake City, TX (US)

(*) Notice: Subject to any disclaimer, the term of this patent is extended or adjusted under 35 U.S.C. 154(b) by 0 days.

(21) Appl. No.: 14/465,006

(22) Filed: Aug. 21, 2014

Related U.S. Application Data

(60) Provisional application No. 61/912,911, filed on Dec. 6, 2013, provisional application No. 61/876,343, filed on Sep. 11, 2013.

(51) Int. Cl.
*B68C 5/00* (2006.01)
*A01K 13/00* (2006.01)
*A61D 9/00* (2006.01)

(52) U.S. Cl.
CPC .............. *A01K 13/007* (2013.01); *A61D 9/00* (2013.01); *B68C 5/00* (2013.01)

(58) Field of Classification Search
CPC ........... A01K 13/007; B68B 5/00; A61D 9/00
USPC ............. 54/82; 168/28, 27, 2, 18, 1; 119/850; 601/166
See application file for complete search history.

(56) References Cited

U.S. PATENT DOCUMENTS

| 2,253,837 | A | * | 8/1941 | Augspurger | 168/2 |
|---|---|---|---|---|---|
| 3,378,004 | A | * | 4/1968 | Claycomb et al. | 601/166 |
| 4,911,150 | A | * | 3/1990 | Farley | 602/23 |
| 5,152,285 | A | * | 10/1992 | Gnegy | 607/108 |
| 5,209,048 | A | | 5/1993 | Hanson | |
| 6,238,427 | B1 | | 5/2001 | Matta | |
| 6,656,208 | B2 | | 12/2003 | Grahn et al. | |
| 7,178,321 | B2 | * | 2/2007 | Ruetenik | 54/82 |
| 8,166,734 | B2 | | 5/2012 | Ruetenik | |
| 8,176,880 | B2 | * | 5/2012 | Hurwitz | 119/850 |
| 2005/0188925 | A1 | * | 9/2005 | Yun et al. | 119/850 |
| 2008/0156503 | A1 | | 7/2008 | McSherry | |
| 2010/0223893 | A1 | * | 9/2010 | D'Arpe | 54/82 |

OTHER PUBLICATIONS

ECB Equine Spa Broscure.
Jennifer M. Keeler, Ice Down to Ride on, The Chronicle of the Horse; Sep. 9, 2013 (www.chronofhorse.com).
E.R. Hunt, Response of Twenty-seven Horses with Lower leg Injuries to Cold Spa Bath Hydrotherapy: Journal of Equine Veterinary Science; vol. 21, No. 4, 2001, p. 188-193.
Pollitt and Van Eps ((Pollitt, C.C. and Van Eps, A.W., Prolonged, continuous distal limb cryotherapy in the horse; Equine Vet. J. 2004; 36(3): 216-220).
Van Eps, A.W. and Pollitt, C.C. Equine laminitis: cryotherapy reduces the severity of the acute lesion. Equine Vet. J. 2004; 36(3): 255-260.
Larson, Erica; Cryotherapy for Laminitis Prevention after Lameness Onset; The Horse Jul. 6, 2012.
Loving, Nancy S; Cryotherapy Methods for Laminitis Treatment Compared (AAEP 2010); The Horse 2010.
Machtey, Dr. I. 1982, Dead Sea Balneotherapy in Osteoarthritis, Proc. International Seminar on Treatment of Rheumatic Diseases.
Thomas; Cold Salt-Water Spa for Horses; California Thoroughbred, Sep. 2008.

* cited by examiner

*Primary Examiner* — Rob Swiatek
*Assistant Examiner* — Magdalena Topolski
(74) *Attorney, Agent, or Firm* — Douglas Baldwin

(57) ABSTRACT

An assembly of a reservoir with a solid sole and an orthotic pad to provide a relatively simple, light weight portable system to allow equine hoof and leg cooling together with proper hoof support. The assembly and method is useful for preventive treatment for performance stress and lameness, including laminitis.

19 Claims, 13 Drawing Sheets

EQUINE ICE BOOT

CROSS REFERENCE TO RELATED APPLICATIONS

This application claims benefit of Provisional Application Ser. No. 61/876,343 filed Sep. 11, 2013 and Provisional Application Ser. No. 61/912,911 filed Dec. 6, 2013. The contents and disclosures of each of these applications are incorporated herein by reference in their entirety for

BACKGROUND

1. Field of the Invention

This invention relates to equine leg and cooling apparatus and method. Specifically, it relates to a boot/elastomeric orthotic pad assembly and method to apply cooling to an equine hoof and leg that is useful for preventive treatment for performance stress and lameness, including laminitis.

2. Background

It is known that cold therapy is helpful in preventing injury in animals before and after stressful activity. As quoted in an article in The Chronicle of the Horse, "Cold therapy is used by every international team at every competition," said Merrick. "Without a doubt, cold therapy got some of our team horses through. It's called high performance for a reason, and the demands on the horses are high. On the international stage where therapeutic medication is not allowed to help with recovery or minor pain relief, icing is the primary way to maintain the horses' comfort and performance." Jennifer M. Keeler, *Ice Down To Ride On*, The Chronicle of the Horse; Sep. 9, 2013 (www.chronofhorse.com). Also see E. R. Hunt, *Response of Twenty-seven Horses with Lower leg Injuries to Cold Spa Bath Hydrotherapy*: Journal of Equine Veterinary Science; Volume 21, Number 4, 2001, p188-193. The use of seawater and magnesium salts in a cold water therapy is also well known as beneficial in healing and recovery of stress and other injuries.

To address the need for equine cryotherapy there is a number of walk-in Equine Spas commercially available. These are finding wide acceptance by equine veterinary specialist, Veterinary schools (such as the University of Tennessee) and individual performance horse owners. While highly beneficial, these are expensive and not portable. The company CET Equine Spas has introduced a "portable" spa unit that comprises a large refrigeration/circulation unit and a stainless bucket for equine to stand one leg into. www.cet-equine-spa.com.

Cold or cryotherapy is also known to be an effective method of preventing or lessening the effects of laminitis in equines. Equine lameness has many causes, of which laminitis is among the most serious. Laminitis, often called founder, is a disease that affects fifteen (15) percent of the horse population and results in debilitation in nearly seventy-five (75) percent of those horses. Despite recent intensive investigation, no cure currently exists; but early detection and prompt treatment can, in most cases, prevent the need for euthanasia. Laminitis is a fastacting disease that attacks and breaks down the connective tissue, the laminae, between the horse's hoof wall and coffin bone. The disease occurs in three successive stages: the developmental, the acute, and the chronic. The developmental stage of laminitis occurs between initiation of the disease and the appearance of acute lameness which lasts a maximum of seventy-two (72) hours. The acute stage can last between four (4) and sixty (60) hours. This means that many horses may be already in the chronic stage of the disease before they receive treatment. Therefore, until an actual cure is found, a feasible method for preventing and treating the disease is needed. While a cure for laminitis may be developed in the distant future, recent research on the use of cryotherapy (or cold therapy) as a potential prophylactic offers immediate hope for preventing the disease. Two landmark studies from the Australian Equine Laminitis Research Unit have opened this area of research. Pollitt and Van Eps ((Pollitt, C. C. and Van Eps, A. W., *Prolonged, continuous distal limb cryotherapy in the horse*; Equine Vet. J. 2004; 36(3): 216-220) initially evaluated the effect of prolonged, continuous cryotherapy to the equine distal limb. They found that continuous cryotherapy was well tolerated and resulted in a marked cooling of the treated foot. In a subsequent study, Van Eps and Pollitt determined that distal limb cryotherapy could be used to prevent laminitis induced by alimentary carbohydrate overload. (Van Eps, A. W. and Pollitt, C. C. *Equine laminitis: cryotherapy reduces the severity of the acute lesion*. Equine Vet. J. 2004; 36(3): 255-260) The results of the Van Eps and Pollitt study suggest that cryotherapy could be used as a potentially effective prophylactic strategy in horses found to be at risk of developing acute laminitis. Even though cryotherapy has been shown to be a potentially effective strategy, the method used, icing down the horse's leg is both cumbersome and imprecise. Furthermore, researchers have previously only used cryotherapy on one leg of the test animals for a short time.

The present invention provides a greatly improved light weight portable apparatus assembly and method for cryotherapy for animals, especially equine animals.

SUMMARY OF THE INVENTION

An object of the present invention is to provide a relatively simple, light weight portable boot system to allow equine hoof and leg cooling together with proper hoof support. The system is helpful in preventing injury in animals before and after stressful activity and in treating laminitis. Since it is well documented that early treatment of laminitis at or before the onset of overt symptoms provides the best results, it is important that embodiments of the invention are sufficiently inexpensive and simple to use so that the treatment will be readily available to horse owners. Other embodiments allow prolonged, semi-automatic cryotherapy treatment.

It is also an object of this invention to be able to provide a means for equine cryotherapy that may easily be applied to any or all four hooves of a horse simultaneously. This is especially useful in preventive treatment of performance stress and prior to the onset of laminitis, which may prevent the development of the disease.

This invention is a "sole plate/elstomeric pad/cooling reservoir" assembly that allows cooling to be provided to the leg and hoof of an equine animal that also provides balanced cushioning of the hoof.

DESCRIPTION OF THE FIGURES

The Figures represent embodiments and aspects of the invention and are not intended to be limiting of the scope of the invention.

DESCRIPTION

Figure 1:
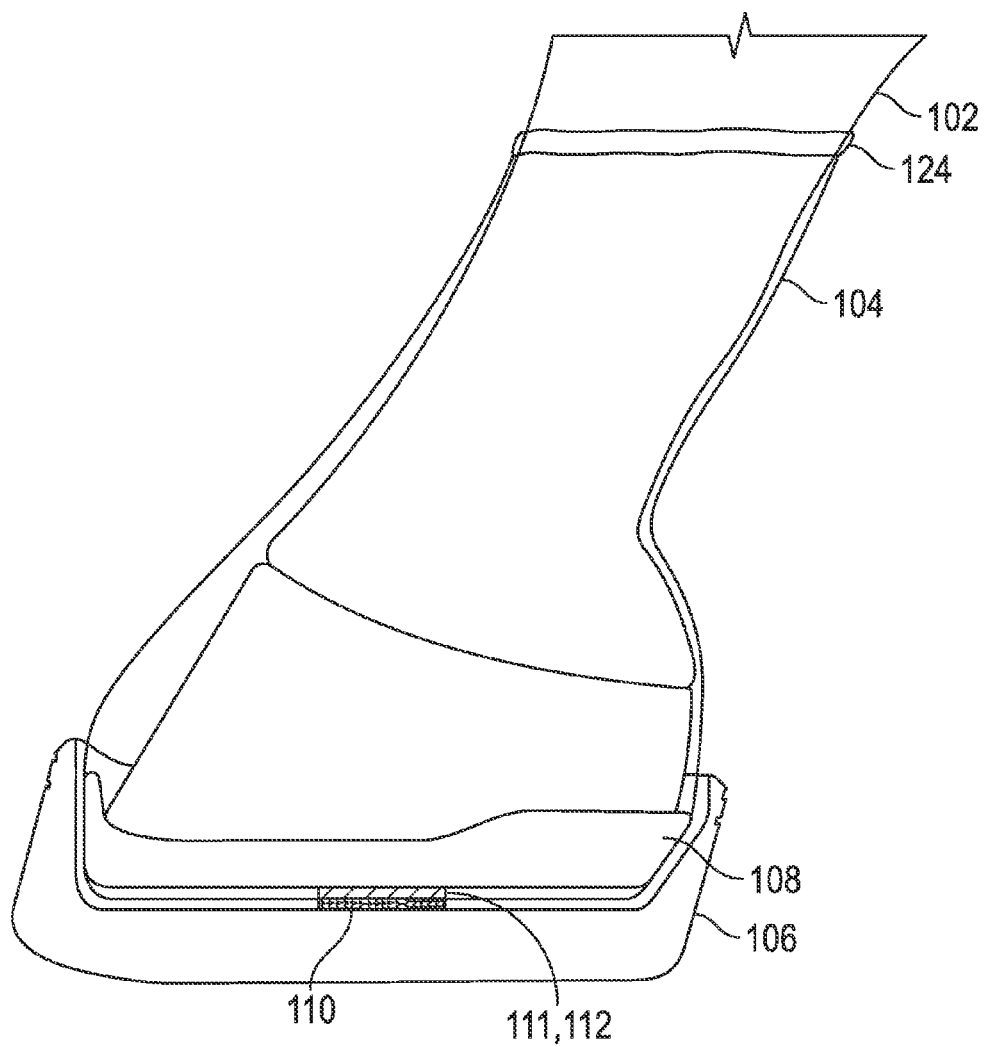
FIG. 1 is a side sectioned view of a cooling boot/sole plate/orthotic pad assembly of an embodiment of the invention.

The benefits of cryotherapy in relieving stressed muscles and in preventing injury is well known and cryotherapy for treatment of equine laminitis has been well documented. Early treatment has been shown to be especially beneficial. Treatment after onset of the condition has more recently been shown to also be effective. It appears that it is not only desirable to cool the leg and hoof but also to provide cushioning support for the hoof if more effective treatment is to be achieved. According to Dr. Raul Bras "cryotherapy is used preemptively during either the developmental phage or during acute early acute laminitis before there are signs of distal displacement of the coffin bones such as rotation or sinking." He also uses "some sort of foot support, such as a boot with pads for sole support, inside the cryotherapy boots . . . ". American Farriers Journal, September/October 2011 www.americanfarriers.com. In the article, Larson, Erica; *Cryotherapy for Laminitis Prevention after Lameness Onset*; The Horse Jul. 6, 2012, the author, reporting on recent cryotherapy treatments says, "These data (from a Van Ep's study) indicate that digital hypothermia effectively prevents the progression of lamellar injury—and even structural failure—when initiated at the detection of lameness in an acute laminitis model." Van Eps concluded, 'This research demonstrates for the first time that the technique is useful even after lameness has developed, and, therefore, there are many more horses than we previously thought that could benefit from this therapy. What we really need is a practical and effective means of cooling horse feet continually for long periods—although it sounds simple, such a device is not yet available.'"

It appears that immersion of the equine hooves and legs in coolant, such as crushed ice in water, is more effective than solid cold packs and the like. In one study by Dr. Heidi Reesink of Cornell University, it was reported: "Reesink and her colleagues set out to examine if ice-filled wader boots would be more effective at cooling the hoof than other methods. They compared an ice-filled wader boot to packing the feet to the level of the fetlock by filling 5-liter fluid boots with crushed ice slurry, or using gel ice packs replaced at 60-minute intervals. The opposite (non-chilled) limb of each horse was used as a comparative control. Reesink also wanted to determine if digital venous temperatures would approximate laminar temperatures, and if digital venous temperatures would be slightly warmer. Individual hoofs were cooled for 2 hours intervals. Minimal cooling occurred in the gel boot, whereas in the ice boot and wader boots dramatic temperature decreases in both laminar and venous blood were achieved. Laminar temperatures remained slightly cooler than venous temperatures, as expected." Loving, Nancy S; *Cryotherapy Methods for Laminitis Treatment Compared* (AAEP 2010); The Horse 2010. Thus, timely cooling and hoof support are important.

In broad scope the invention is an apparatus assembly for cooling the leg and hoof of equine animals that also provide support for the underside of the hoof. The invention is expressed in a variety of embodiments ranging from a flexible bag (reservoir) to contain a coolant (such as ice water) around an equine leg that is disposed in a rigid (preferably sloped) 6 bottom structure (sole plate) and into which is disposed an elastomeric orthotic pad to support the hoof in the simplest form to a more complex assembly comprising a semi-rigid boot with zippered sides, a drain and stiffening battens.

Figure 2:
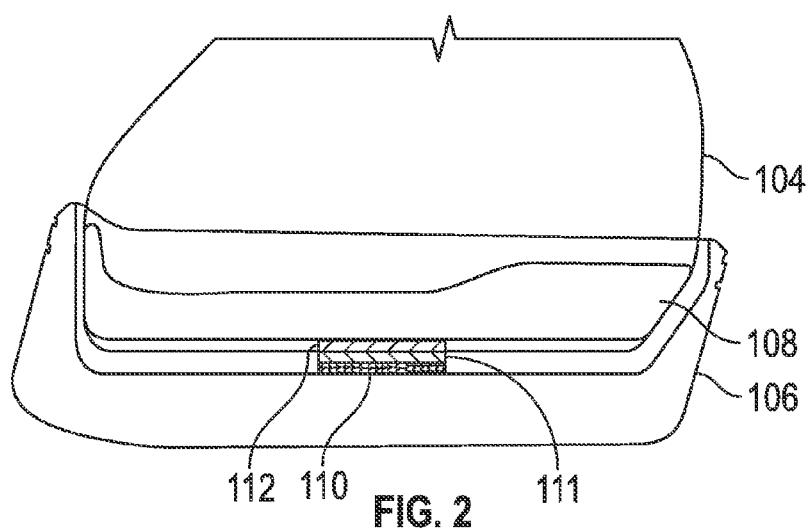
FIG. 2 is a side sectioned view of the lower section of a cooling boot/sole plate/orthotic pad assembly of an embodiment of the invention.

Referring to FIGS. 1 and 2 there is shown a boot sole plate 106 having a coolant bag 104 attached. A suitable and effective sole plate is described in detail in U.S. Pat. No. 8,220,231 issued Jul. 17, 2012. Similar suitable sole plates are described and shown in; US 2011/00673661 published Mar. 24, 2011; U.S. Pat. No. D565,256 issued Mar. 25, 2008 and U.S. Pat. No. D616,614 issued May 25, 2010.

The descriptions and Figures of these applications and patents are incorporated herein by reference for all purposes.

Inside the bag 104 is disposed an elastomeric shock-absorbing orthotic pad 108. An equine leg, 102, fits inside the coolant bag and rests on the orthotic pad 108. To prevent rotating of the pad, it is important that the bag be secured to the top inside of sole plate and that the pad is secured to the bottom inside of the bag. It is preferred that the attachment of the pad to the bag and the bag to the sole plate be secure but be capable of detachment. A convenient means of providing a removable, secure attachment is to provide a hook-and-loop strap to the underside of the orthotic pad, 112 to mate with a matching hook-and-loop strap on the bottom side of the coolant bag, 111. When the mating hook and loop straps are connected, it prevents the pad from rotating in the boot during use. A hook-and-loop strap connects to the underside of the bag, 111, to mate with a matching hook-and-loop strap on the inside bottom of the sole plate, 110. The hook-and-loop straps may be sewn or attached by adhesive to the bag with one piece on the inside of the bag and another on the outside bottom of the bag. Attachment of a hook and loop strap pieces and the appropriate sizes are described U.S. Pat. No. 8,220,231 issued Jul. 17, 2012; US published application 2011/0279184 and, published Mar. 24, 2011, the disclosures and appropriate Figures of which are incorporated herein by reference.

In use, the coolant bag may be filled with suitable coolant to surround the lower leg and hoof walls. The top of the bag may or may not be closed, as with an elastic band, tie or the like, (124 in FIG. 1 and 129 in FIG. 4) around the leg, 102. Coolant may also be circulated into and out of the bag by suitable pumping means through conduits that could be placed at the top of the bag and extending to near the bottom.

Alternatively, the bag may simply be open on the top and in one embodiment have an expanded top to facilitate adding coolant. See FIG. 3. The cooling bag 118 is disposed in and attached to the sole plate 106 and the bag and the pad 108 is disposed in the cooling bag with bag, pad and sole plate attached (preferably removably) together as described above for the embodiment of FIGS. 1 and 2. The bag may also have a drain to enable cold water to be drained off to allow additional ice to be added at the top of the bag. It may also be drained through a conduit tube extended from the top of the bag to the lower inside section of the bag through which water may be removed, as by suction. The tube (conduit) may also be used to circulate coolant and/or provide a flow of air into liquid in the bag reservoir.

Figure 4:
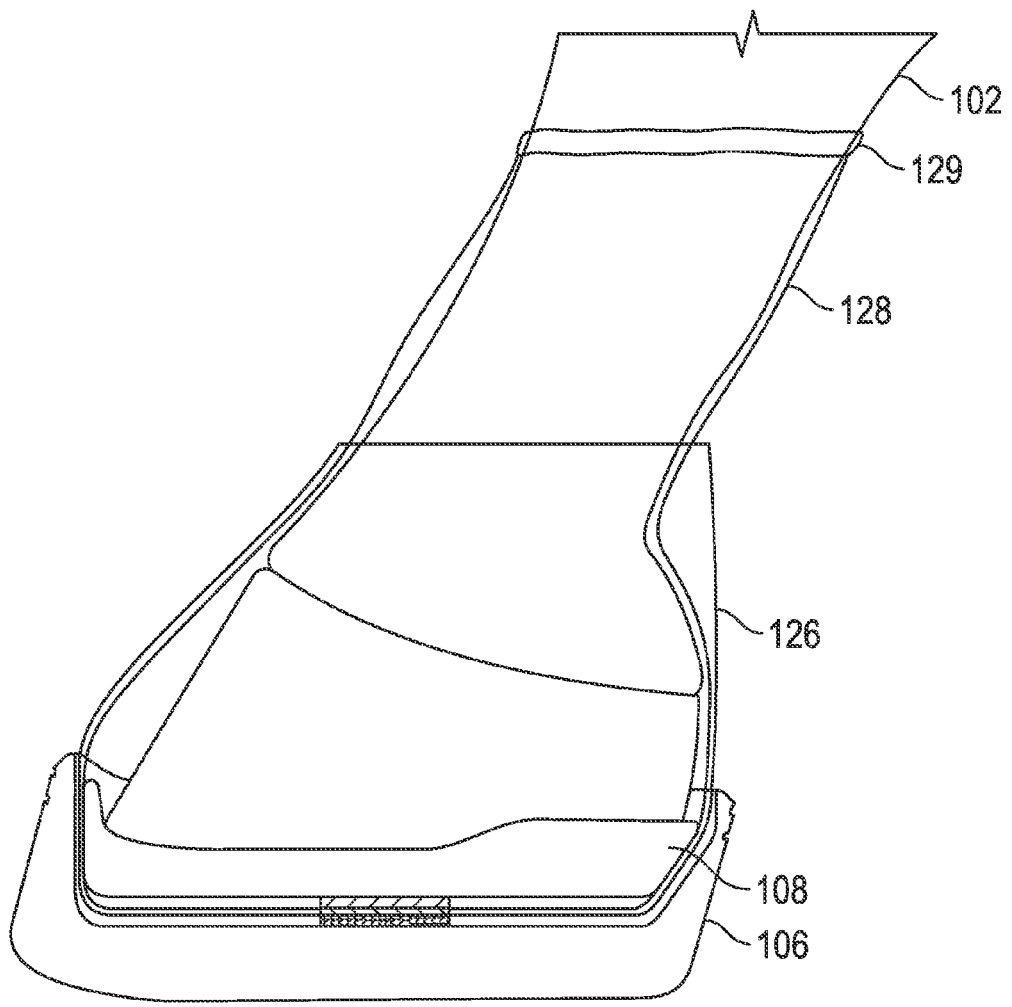
FIG. 4 is a side sectioned view of an assembly of an embodiment of the invention.
Figure 5:
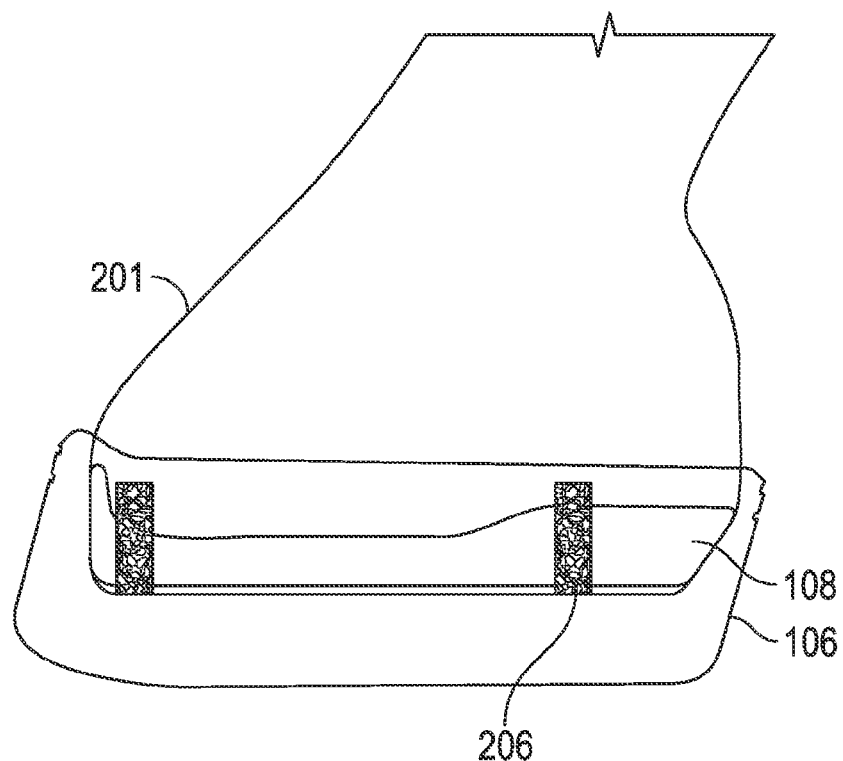
FIG. 5 is a side sectioned view of an assembly of an embodiment of the invention.
Figure 6:
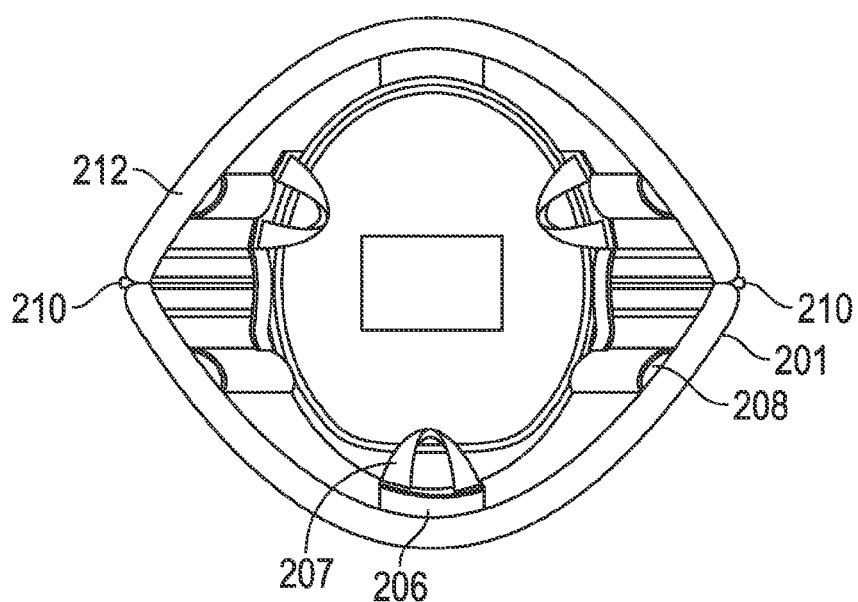
FIG. 6 is a top view of an assembly of an embodiment of the invention.

In another embodiment the coolant bag and pad is disposed in a fabric boot 126 (having a sole plate) as shown in FIG. 4. The embodiment illustrated in FIG. 4 is a coolant bag as described above but is disposed in a fabric boot for support.

Suitable boots for this use are described in U.S. Pat. No. 8,220,231 issued Jul. 17, 2012; US 2011/00673661 published Mar. 24, 2011; U.S. Pat. No. D565,256 issued Mar. 25, 2008 and U.S. Pat. No. D616,614 issued May 25, 2010. The descriptions and Figures of these patents and applications are incorporated herein by reference for all purposes.

Figure 3:
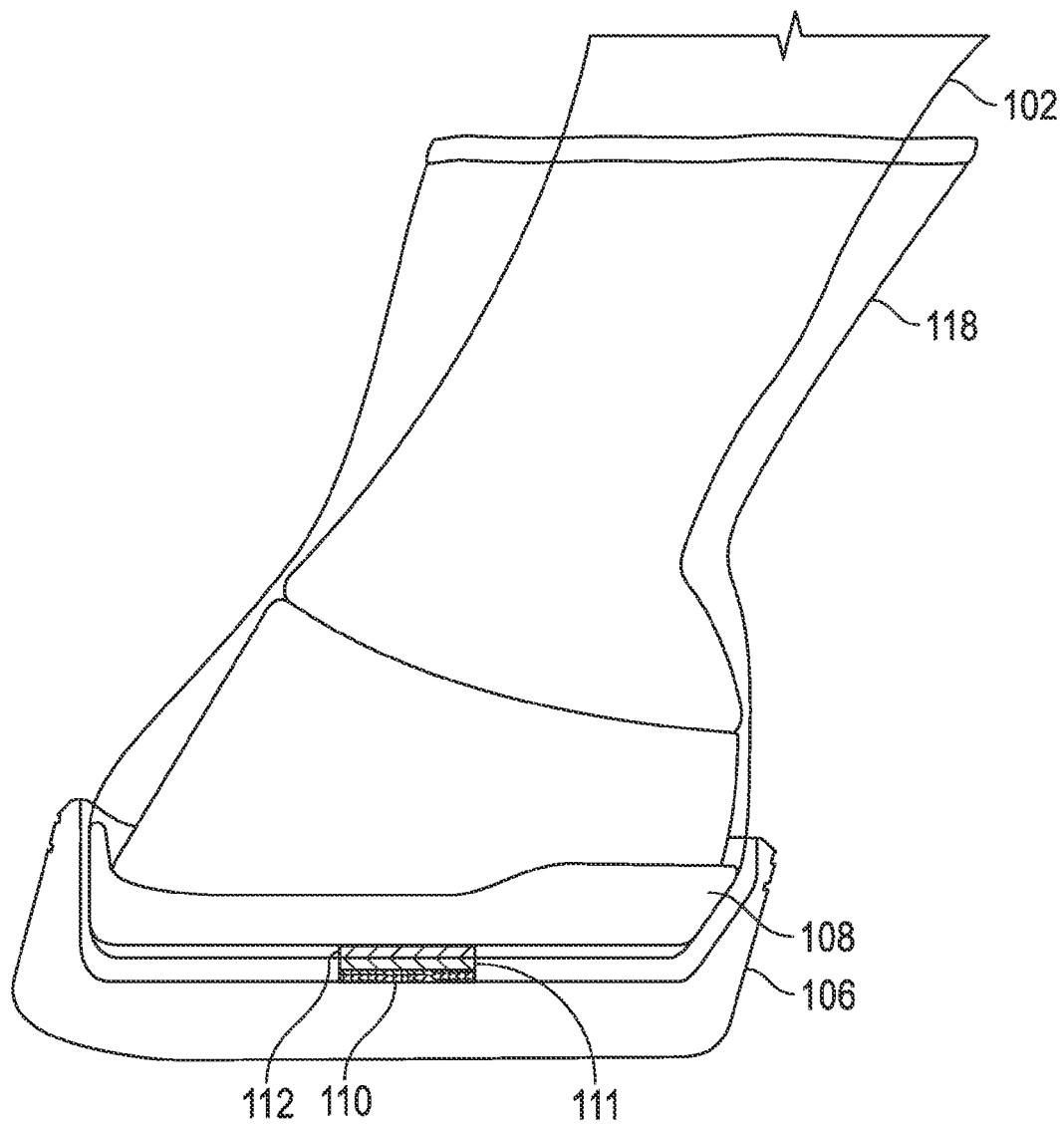
FIG. 3 is a side sectioned view of a cooling boot/sole plate/orthotic pad assembly of an embodiment of the invention.

In the embodiments described in reference to FIGS. 1, 2 and 3 the sole plate, 106, is secured to the bag by the attachment 110, 111 and 112. The sides of the sole plate may also be attached to the bag or boot by adhesive or stitching (waterproofed). In the embodiment shown in FIG. 4 it is attached to the bottom section of a fabric boot into which a coolant bag is disposed. The sole plate helps to hold the orthotic pad in position on the hoof, and if walled around the entire circumference (as is preferred), it prevents the hoof sliding forward or rearward while in use. Moreover, the sole plate walls are important in confining the circumference of a compressible orthotic pad in place. The walls should surround the entire circumference of the sole plate and be sufficiently high (from the surface of the sole plate) to cover the mid length thickness of the orthotic pad. If a relatively "soft" pad is used (as is usually desirable) the weight of the horse will flatten the pad and, if there were an opening in the sole plate wall the pad would be extruded out the opening. Being circumferentially confined, a portion of the pad will project upward if a portion in depressed providing a massaging action when the equine shifts its weight. Thus, it is especially important that the bottom circumference of the boot be solid (that is whole without openings) and sufficiently strong to circumferentially contain the soft orthotic pad when it is attempted to be squeezed outward by the pressure of the equine hoof. By having the sole plate wall entirely surrounding the circumference, the pad is held in place and will conform to the shape of the hoof—and adapt to the shape of the hoof as the horse moves. This provides a desirable massaging action and allows the horse to find the best natural balance position—similar to the effect of having the horse stand in loose sand. The ability to achieve natural balance is especially important for horses with injured or diseased hooves.

The sole plate is preferably removably attached to the bottom of the cooling bag. Attachment may be accomplished by either an adhesive and/or by mechanical mean. For example, the sole plate may be first attached by a suitable adhesive then sewn to the lower portion of the fabric boot.

The coolant bag may be constructed of any suitable material, such as fabrics and flexible polymer materials. Since it is desirable that there be means for attaching the cooling bag to an orthotic pad on the top side of the bottom of the bag and to the sole plate on the bottom side of the bag, the material is desirably one that will allow such attachment as by plastic welding such as RF welding. A prototype bag was made of PET film that is used for antistatic wrapping for electronic parts. Choice of suitable polymers material films for the bags is well within the skill of the art. Simple plastic bags such as polyethylene or polypropylene may be used but generally will be insufficiently strong and will be difficult to attach.

Fabrics, such as those used in equine boots may be used and may to be coated to make them waterproof. Waterproof nylon as used in umbrella and the like are suitable. Another suitable fabric is an 18 oz. Ballistic cloth used by the U.S. military for bags. A DuPont nylon woven fabric, CORDURA®, available in several weights, may be used. The 330 denier fabric is preferred. Such a fabric is especially suitable for the sides of the boot that a bag is disposed in as in FIG. 4.

Coolant may be as simple as crushed ice 225 in water, which will be very suitable in most situations. Other coolants may also be used, particularly if the coolant is externally cooled and circulated in the coolant bag or boot. Suitable coolants should have good thermal conductivity, a low flash (or vaporization temperature) point, be non-corrosive, inexpensive and readily available. Some useful coolants include, but are not limited to: chilled water, ethylene glycol, propylene glycol, methanol/water, ethanol/water, calcium chloride solution, potassium formate/acetate solution. The choice of coolant can also be made to affect the temperature of the coolant. Mineral salts may also be added to the coolant. Temperatures to which the hoof can be cooled are not extreme—e.g. it is unlikely that the temperatures below about zero (0)° F. will be desirable. Generally coolants will be above about 32° F.

Coolants, before being used in the coolant bag or boot, may be suitably cooled by placing ice, cool-packs, dry ice or the like in an external coolant reservoir to obtain the desired temperature. Of course, the coolant, if circulated, may be continuously refrigerated by a cooling means such as a refrigeration unit.

In some embodiments the reservoir is a boot made of semi-rigid material. Embodiments of the invention with a boot reservoir are illustrated in FIGS. 5-11 and 15-20. The boot is specially constructed to contain a coolant and to be more robust and stable than the coolant bag of the embodiments described above. It is preferred that the boot be conical shaped, smaller at the bottom and enlarged at the top. The boot may be made of a simple water-proof fabric and desirably has at least one zipper (or other opening device), and preferably two, to facilitate placing an equine leg in the boot. The boots, in preferred embodiments, have a drain with a flexible conduit attached that can also be used (if transparent) as a sight glass for liquid level in the boot and as a conduit to carry air (or other suitable gas) into the boot to provide circulation and a bubbler effect and to increase the oxygen content of the coolant liquid. The boot will in some embodiments also have a harness to attach to the equine leg and to securing means in the boot to prevent the equine from stepping out of the boot, i.e to allow the boot to be lifted with the leg.

Referring to FIGS. 5-11 there is shown a coolant boot assembly having a coolant boot 201 disposed in a sole plate 106. Preferably the sole plate walls is sewn (or attached by adhesive or both) to the sides of the lower portion of the boot. Suitable and effective sole plates are illustrated in the Figures and, as with the coolant bag embodiments described above, are described in more detail in U.S. Pat. No. 8,220,231 issued Jul. 17, 2012. Similar suitable sole plates are described and shown in; US 2011/00673661 published Mar. 24, 2011; U.S. Pat. No. D565,256 issued Mar. 25, 2008 and U.S. Pat. No. D616,614 issued May 25, 2010. The descriptions and Figures of these patents are incorporated herein by reference for all purposes.

Inside the boot 201 is disposed an elastomeric shock-absorbing orthotic pad 108. To prevent rotating of the pad, it is important that the boot bottom be secured to the top inside surface of the sole plate (to the boot bottom that is attached to the sole plate) and that the pad be secured to the bottom inside of the boot. It is preferred that the attachment of the pad to the boot and the boot to the sole plate be secure but be capable of detachment for removable and replacement. A convenient means of providing a removable, secure attachment is to provide a hook-and-loop strap to the underside of the pad, 110 to mate with a matching hook-and-loop strap on the bottom side of the coolant boot, 110. When the mating hook-and-loop straps are connected, it prevents the pad from rotating in the boot during use on a horse. The hook- and loop straps may be sewn to the boot fabric or attached by adhesive. Attachment of a hook and loop strap piece and the appropriate sizes are described U.S. Pat. No. 8,220,231 issued Jul. 17, 2012; US published application 2011/0279184 and, published Mar. 24, 2011, the disclosures and appropriate Figures of which are incorporated herein by reference.

Figure 7:
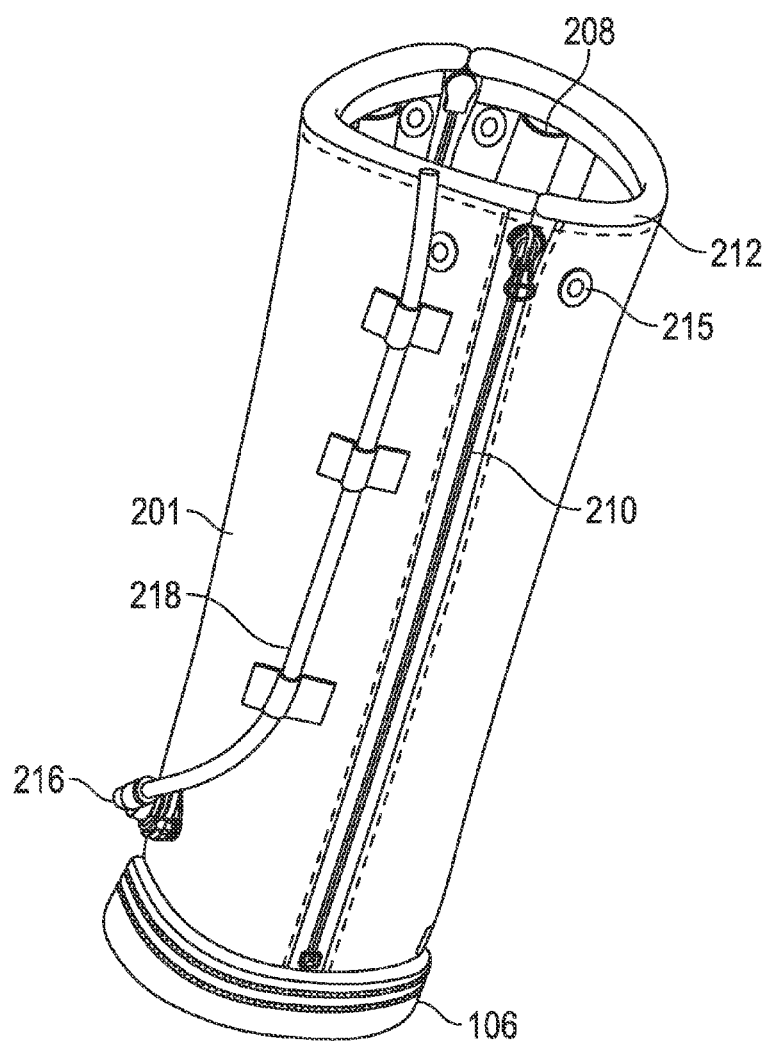
FIG. 7 is a perspective view of an assembly of an embodiment of the invention.
Figure 8:
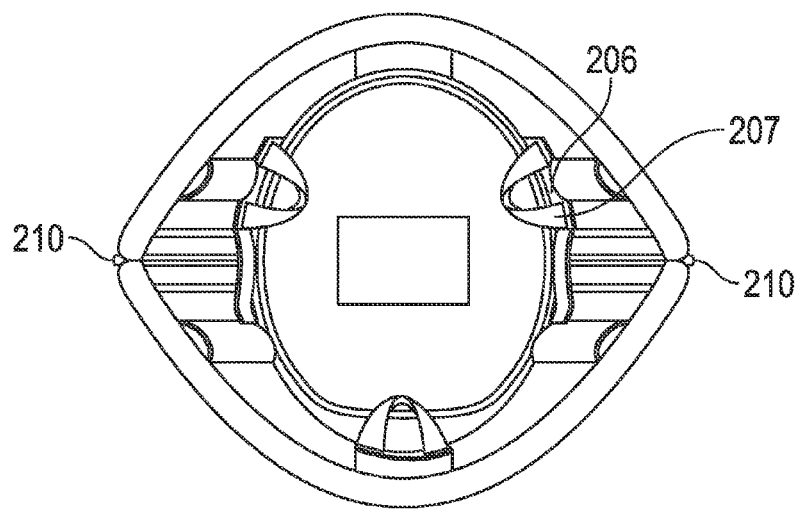
FIG. 8 is a top view of an assembly of an embodiment of the invention.
Figure 9:
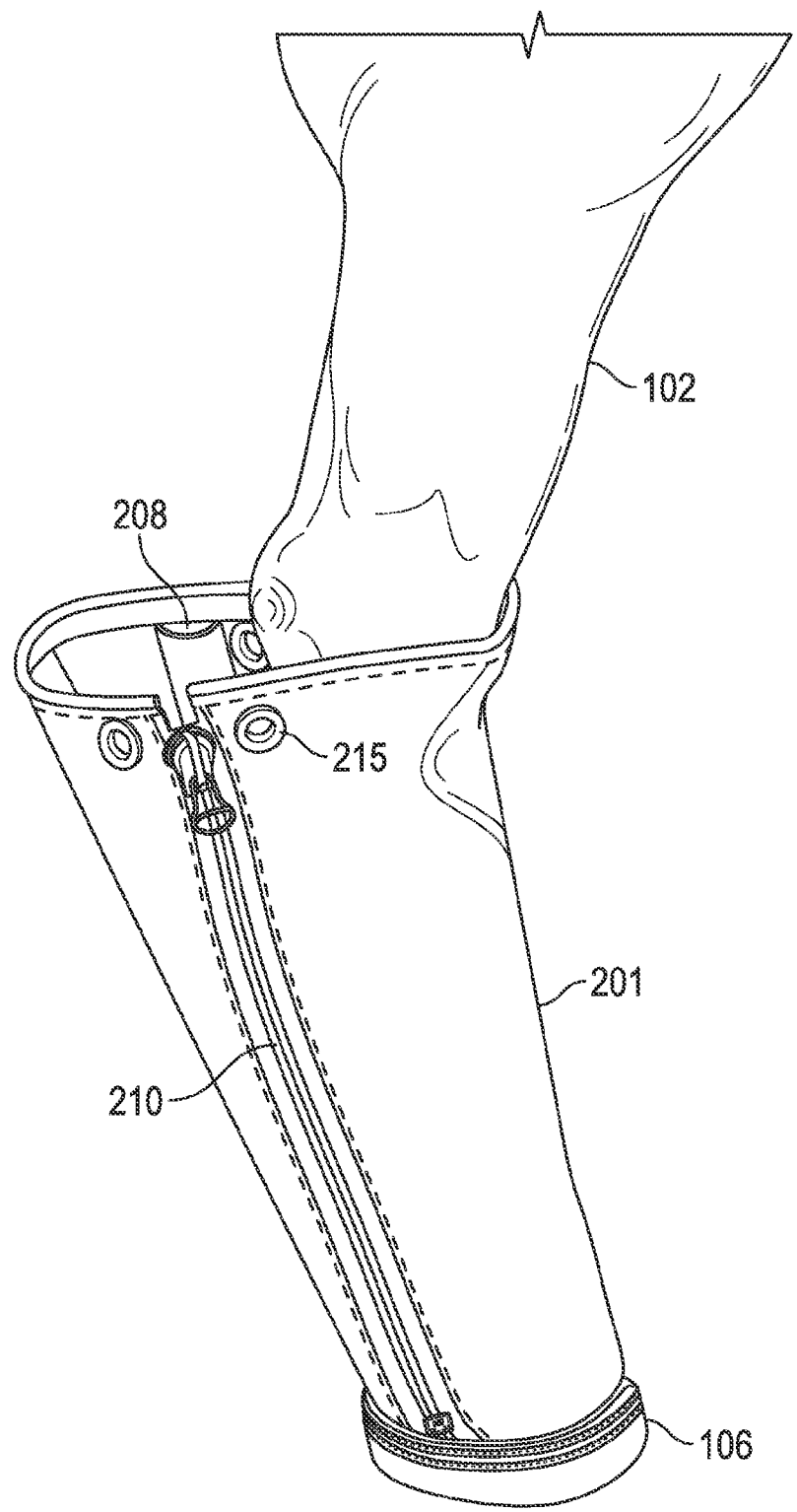
FIG. 9 is a perspective view of an assembly of an embodiment of the invention.
Figure 10:
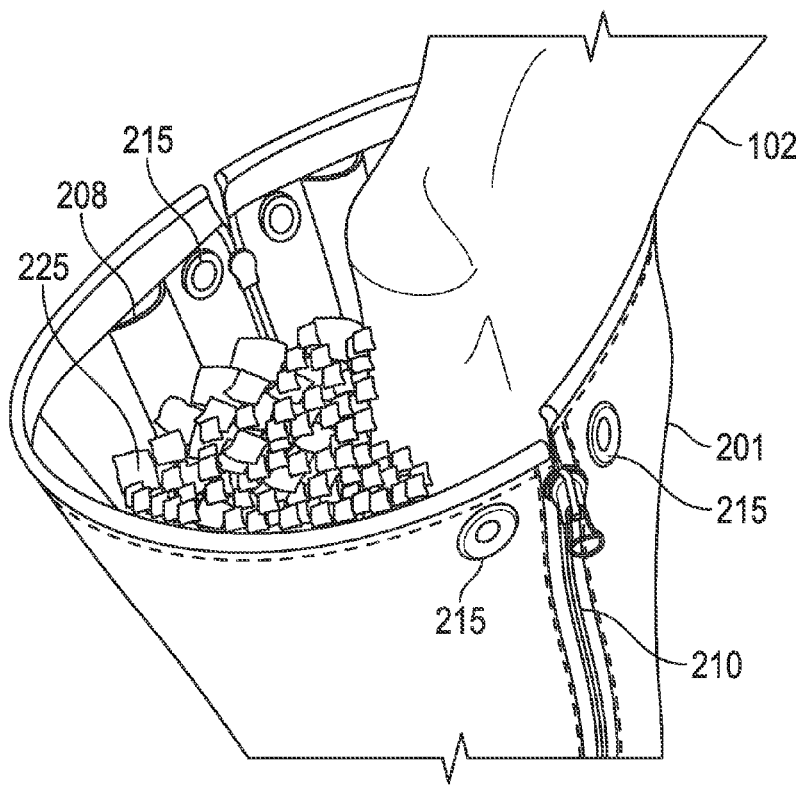
FIG. 10 is another perspective view of an assembly of an embodiment of the invention.
Figure 14:
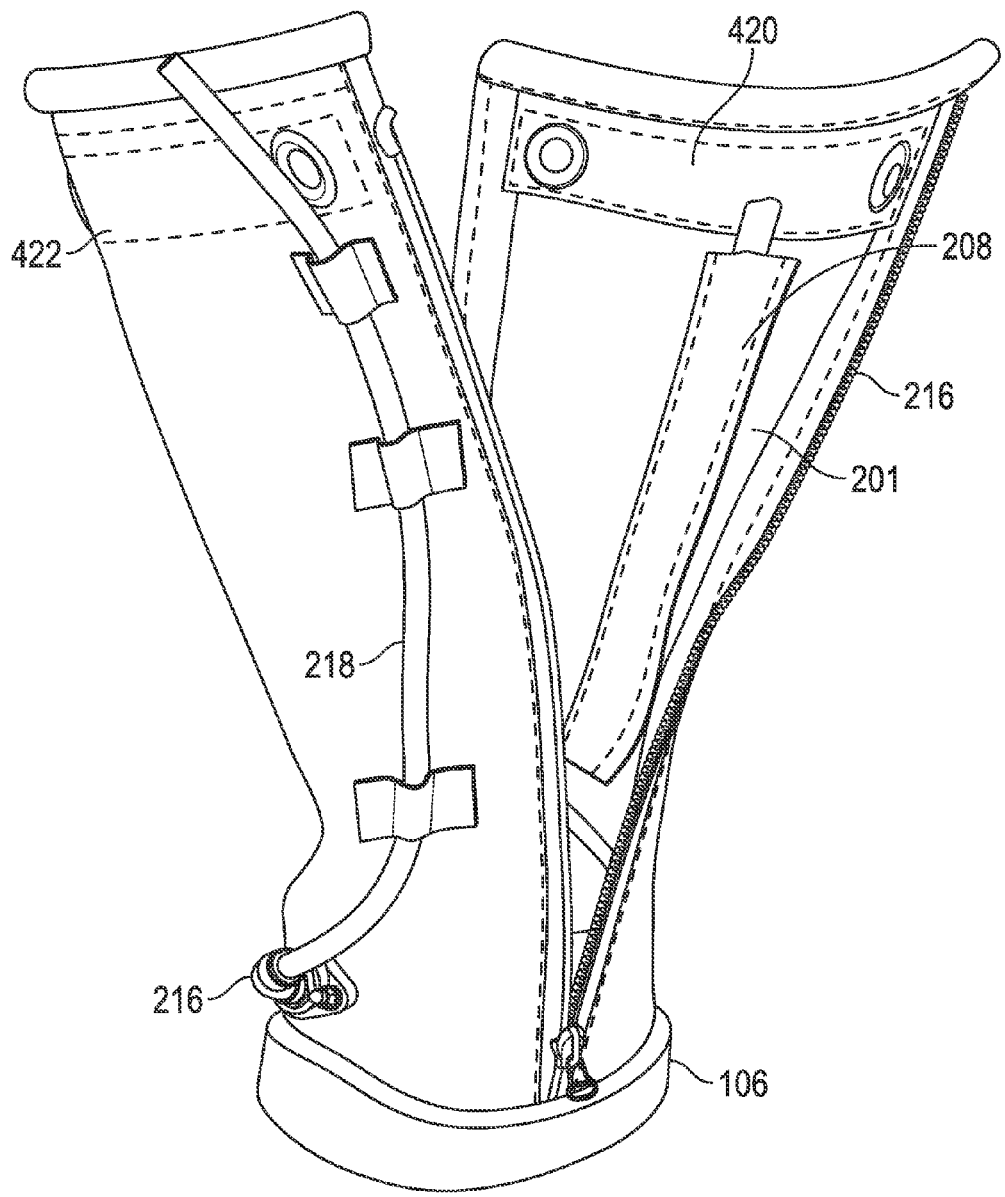
FIG. 14 is perspective view of an embodiment of the cooling boot of the invention showing the halves of the boot open and the attachment means for a top closure.
Figure 15:
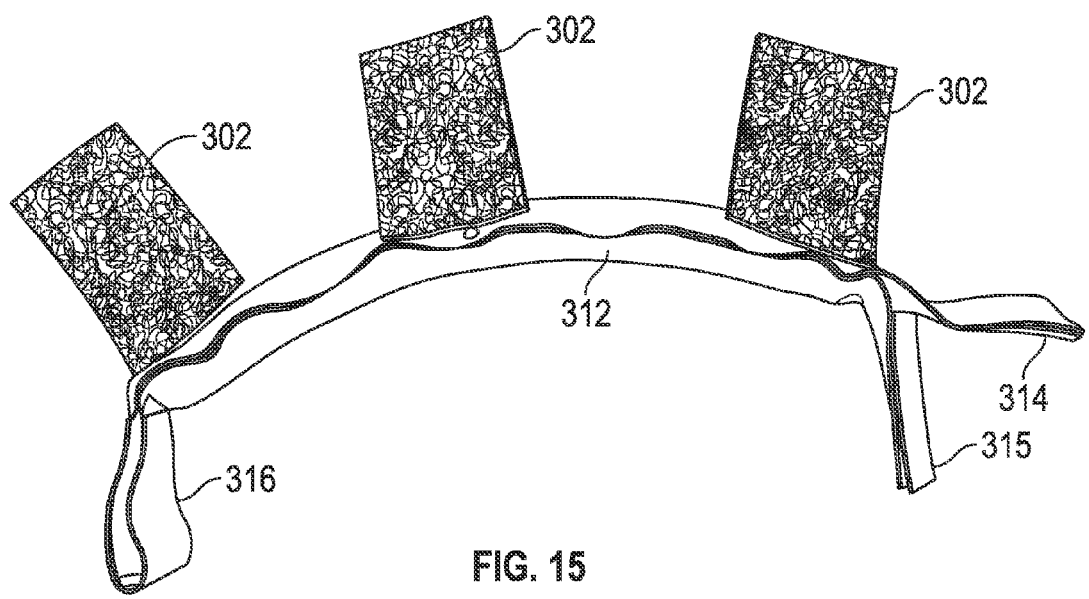
FIG. 15 is a perspective view of a leg retaining collar of an embodiment of the invention.
Figure 16:
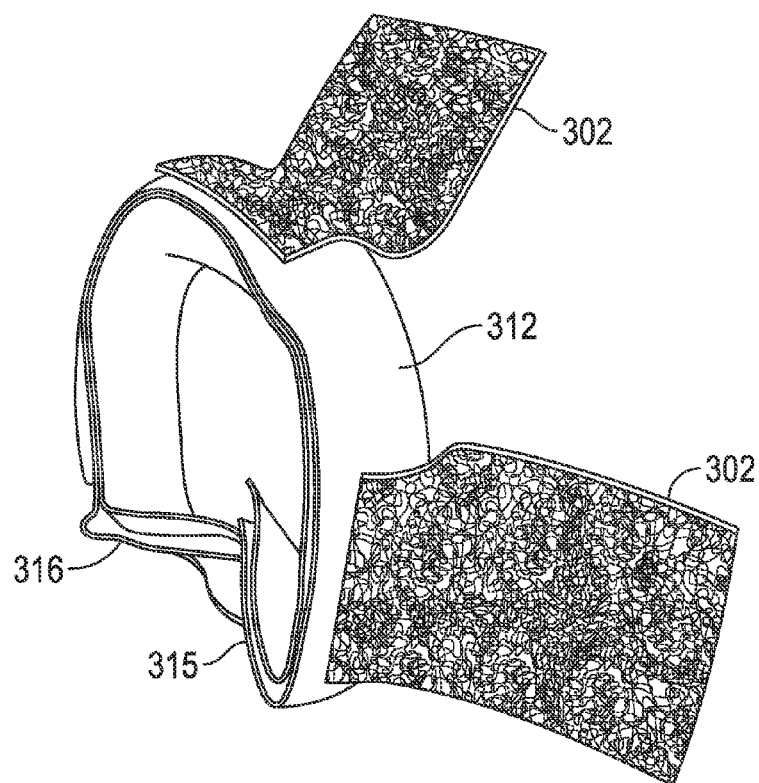
FIG. 16 is a perspective view of a leg retaining collar of an embodiment of the invention.
Figure 17:
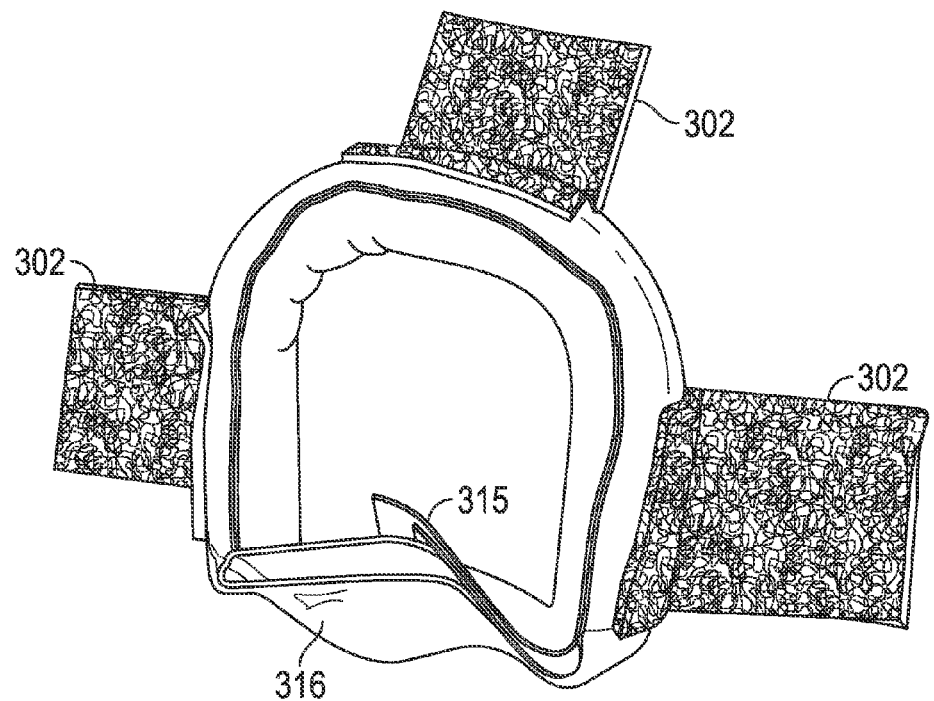
FIG. 17 is a perspective view of a leg collar of an embodiment of the invention.
Figure 18:
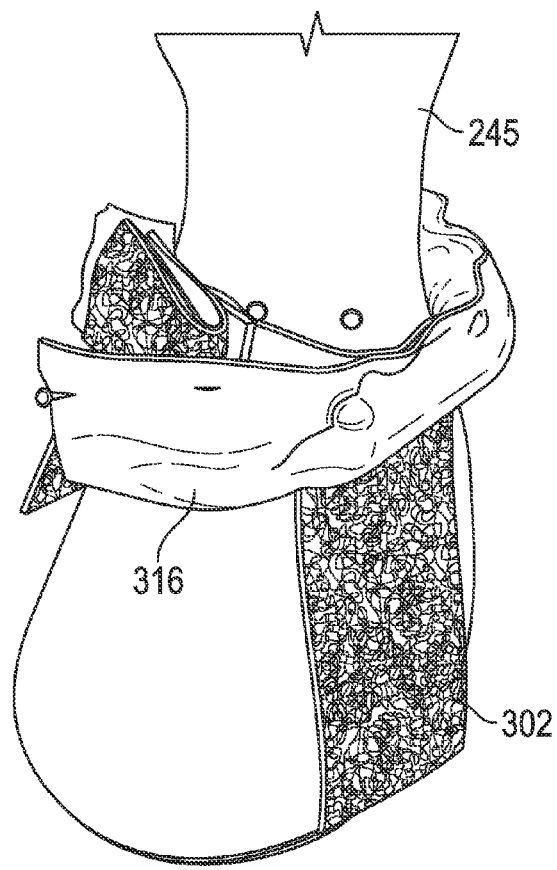
FIG. 18 is a perspective view of a leg collar attached around a simulated equine leg with hook and loop straps to attach to matching hook and loop strap in a boot.

The boot is open at the top. The boot may also have a drain, 216 in FIGS. 7 and 14, to enable coolant (such as cold water) to be drained off to allow additional ice to be added at the top of the boot. Drain valves such as those used to drain boats that have a plug that is retained in the drain hole are suitable. Water may also be drained through the drain valve to a flexible (preferably transparent) tube (218 in FIGS. 1 and 14). The tube can be loosely attached to the sided of the boot as shown FIGS. 7 and 14. The tube may also be attached to a suction bulb to initiate a siphoning action to drain water from the boot. Additionally the tube may be attached to a pump to circulate water in the boot and around the equine hoof or an air pump to bubble air through the water in the boot. Coolant may also be circulated into and out of the boot by suitable pumping means through the tube or through conduits that are placed at the top of the boot. The tube, 218, when attached to the drain 216 and disposed alongside the boot as shown in FIGS. 7 and 14 can be used as a handy sight glass to determine the liquid level in the boot. The tube can also facilitate bubbling air or other gas into the liquid in the boot to mix the coolant, oxygenate the coolant and provide a massaging action. This may be particularly useful in the ice spa embodiment described below.

More details of the coolant boot are shown in FIGS. 6-11. A schematic of a prototype boot is shown in FIGS. 5-11. A boot, 201, has a semi-rigid sole 106 and side walls 201. The sole plate, in most embodiments, is conical shaped for better mobility and less torque on weakened lamini. The conical shape facilitates icing of the hock joint without the need for the boot to be enlarged over its entire length. The conical shape also enables it to be conveniently used on both front and hind legs including the knees and hocks with the taller model. This is especially important for the taller boots that are designed for performance horse treatment. The shorter version is better suited for treatment of laminitic horses a where the hock joint does not need icing. The shorter boot can have a smaller top circumference (less conical) that will be lighter and allow (with an optional top closure) horse to better ambulate and lay down. This is very desirable in a three days, 72 hour, treatment protocol because the lamini is painful and inflammation is weakened the connectivity of the hoof wall and bone column.

Waterproof zippers, 210 are located around the sides of the boot 201. Two zippers placed opposite each other have performed well in trials of a prototype and are preferred. One or more zippers are suitable in appropriate circumstances. These zippers allow the boot walls, 201, to be opened to allow the equine hoof to be fitted into and secured in the boot and be properly placed on an orthotic pad, 108, located in the inside bottom of the boot (see FIGS. 16-17). Items 208 (FIGS. 6-10) are pockets extending substantially the length of the boot wall into which are placed stiff battens to hold the boot upright and prevent sagging. In a prototype, the walls, 201, were made of a Polyurethane (TPU) coated fabric and the batten polymer pockets and zipper were rf welded to the TPU fabric. Battens were fiberglass. The relative locations of the zippers (210) and batten pockets, 208, are shown in the Figures. These locations are illustrative only and have proved useful in a prototype, but other locations, and number of zippers and batten pockets may also be varied as desired and such other arrangements are within the scope of this invention. The important aspect is that the boot walls may be opened (or able to be folded down) to fit the hoof into the boot and secure it to the boot bottom. Other forms of opening devices, rather than zippers that will allow the boot to hold water for a substantial period are also within the scope of the invention. Lighter weight fabric may be used and will allow a boot without zippers or other side opening to be rolled down to allow access to the boot bottom. The conical shape is very important for roll down boots. The removable battens hold the boot upright but can be removed when the sides are opened or rolled down.

FIGS. 9-10, 17 and 19-20 illustrate a prototype of a boot of this invention fitted on a horse's leg. Items 215 are optional grommets that will allow the boot to be suspended from a strap on an equine back (or otherwise) and are useful but not an essential component of the invention. The top of the boot has a fold, 212, that provides a smooth top side and may be filled with foam such as a foam rope to help prevent the boot top from chafing or cutting into the skin of the equine leg. The fold is made of polymer fabric that can provide a soft, smooth surface to prevent chafing or otherwise damaging the skin of the leg. Dyneema® (UHMwPE polyethylene) fabric is very suitable.

Prototype boots have a bottom of about 22 inches circumference and 36 inches top circumference (giving them a conical shape) and a height of about 20 inches for laminitis treatment and about 28 inches for treatment of exercise stress (where knee coverage is desired). Performance horses that are stressed from exercise also benefit from icing the legs. Generally it is preferred that boot for performance equine treatment that need knee icing will be taller and n more conical than shorter boots for laminitis treatment. A boot height of about 28 inches is sufficient. For treatment of laminitis, boots of 20 inches height are preferred since it is not desired to ice the knee.

The boot may be constructed of any suitable material, such as fabrics and flexible polymer materials capable of retaining water. Since it is desirable that there be means for attaching the cooling boot to an orthotic pad on the top side of the bottom of the boot and to the sole plate on the bottom side of the boot, the material should be one that will allow such attachment. Simple plastic boots such as polyethylene or polypropylene may be used but generally will not be sufficiently strong and will be difficult to attach components. Fabrics, such as those used in other equine boots may be used and may to be coated to make them waterproof. A TPU coated polyester fabric is used effectively in prototype boots. In a prototype a TPU coated fabric (for example polyester or polyester or Nylon™) is used to good effect. The fabric is commercially available from numerous sources including Mesa Laminated Fabrics (www.mesafabrics.com) and Eastex Products (www.eastexproducts.com). In a prototype, Mesathane 6036 from Mesa Laminated Fabrics (35 or 45 gage) works very well. The TPU coating allows RF welding that is an important consideration in constructing batten pockets and attaching zippers described below.

Coolant, as for the embodiments of FIGS. 1-4, may be as simple as crushed ice in water, which in the open top boot will be very suitable and is preferred. Other coolants may also be used, particularly if the coolant is circulated in the coolant boot as are described above for the coolant bags.

The sole plate is a separate molded piece. In the embodiments of FIGS. 1-11 it is shown attached to the bottom of an upper boot. As discussed above for embodiments of FIGS. 1-4, the sole plate helps to hold the orthotic pad in position on the hoof, and is preferably walled around the entire circumference. It prevents the hoof sliding forward or rearward while in use. The sole plate is important in confining the circumference of an orthotic pad. If a relatively "soft" pad is used (as is usually desirable) the weight of the horse will flatten the pad and, if there were an opening in the sole plate the pad would be extruded out the opening. It is especially important that the bottom circumference of the boot be entire. By having the sole plate wall entirely surrounding the circumference, the pad is held in place and will conform to the shape of the hoof—and adapt to the shape of the hoof as the horse moves. These features provide a desirable massaging action and allow the horse to find the best natural balance position—similar to the effect of having the horse stand in loose sand. The ability to achieve natural balance is especially important for horses with injured or diseased hooves. The sole plate is also desirably sloped front to back on the bottom to provide an easy break-over as is described in the patents and applications disclosed above of sole plates and are incorporated herein by reference for all purposes. The sloped sole allows a whole roller motion of the sole to eliminated tearing and trauma of a horse moving or turning. It relieved stress on the deep digital flexor tendon. This can be especially important because of the extra weight of the water filled boot. This type sole also allows the use of an optional rocker attachment as described in published application 2011/0067366, published Mar. 4, 2011, the disclosure of which is incorporated herein by reference for all purposes.

The sole plate is attached to the bottom of the cooling boot. Attachment is preferably accomplished by either an adhesive and/or mechanical mean. For example, the sole plate may be first attached by a suitable adhesive then sewn to the lower portion of the cloth boot. It has been found that two rows of stitching is especially preferred to prevent the sole from coming detached from the fabric upper during use. A double row of stitching is indicated in the sole plate of FIG. 14.

Removable Attachment of Equine Leg to Boot

Figure 11:
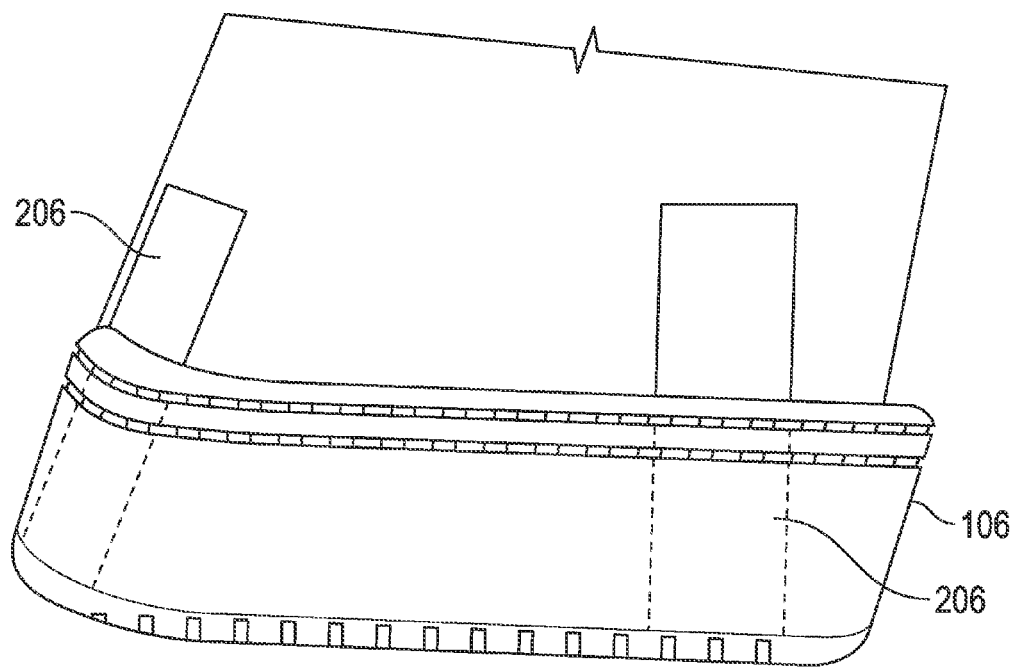
FIG. 11 is side view of an assembly of an embodiment of the invention.
Figure 12:
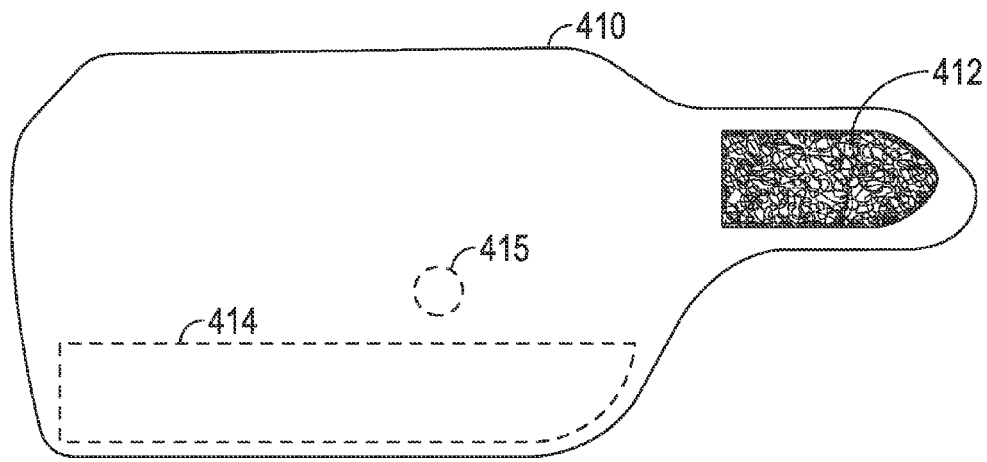
FIG. 12 is side view of an assembly of an embodiment of the invention.

An important aspect of the boot of this invention is the inclusion of means to removably secure the equine leg and hoof to the boot so that when the equine lifts its leg the boot will remain attached. FIG. 4 is such a means using a standard boot in a coolant bag 128. A preferred attachment means is shown in FIGS. 6, 8, 11, 15-19. Referring to FIGS. 15-19, there is as soft fabric member 312 including tabs 314, 315, and 316 to which is attached three hook and loop straps 302. These straps are designed to hold the collar into a circle around an equine leg, 245 (FIG. 18) and straps 302 attach to matching straps in a boot bottom, 206 in FIGS. 6, 8 and 11. This collar will generally be a fold of fabric sewn together and may have a foam rope inside to aid in attachment around the leg and in preventing chafing and other damage to the skin of the leg. As shown in FIGS. 5, 6, 8 and 11 the straps are attached to the bottom fabric of the boot. The relative location of an embodiment is as shown (at positions 2, 6 and 10 o'clock, based on clock face). The collar, 312 of FIG. 8-12 is placed around the equine leg, 245, as illustrated in FIGS. 11 and 12. The collar is attached to the leg and the leg and hoof placed in position in the boot bottom and the hook and loop straps of the collar (312) are attached to the straps 206 in the boot. There are optionally provided tabs 207 to facilitate alignment and proper attachment of the loops 206 to 312. The items 312 and 206 are hook and loop mating straps so one will be a hook strap and the other a loop. This provides a removable attachment of the leg to the boot so that when the equine lifts its leg the boot will stay connected to the hoof and remain in proper position on the orthotic pad. This also helps prevent getting ice particles under the hoof that could cause discomfort when the equine stands down.

A preferred fabric for the collar is a custom woven anti-rub cover of UHMwPE (ultrahigh molecular weight polyethylene). The fibers have a very low coefficient of friction, significantly lower than nylon and are comparable to Teflon and are highly resistant to abrasion and have extremely low moisture absorption.

Figure 13:
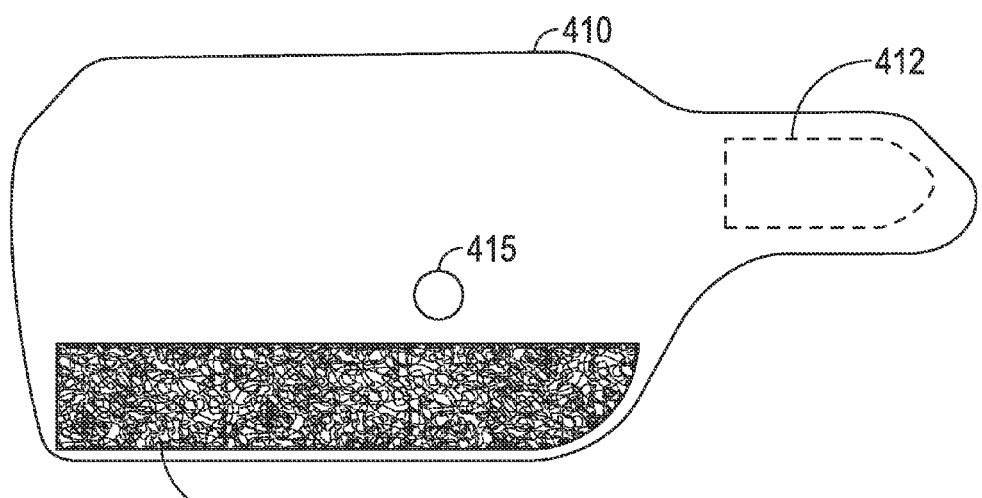
FIG. 13 is side view of an assembly of an embodiment of the invention.

An additional optional aspect of the coolant assembly of the invention is a flexible removable closure for the top of the boot. If the boot is placed on a horse and the horse is jostled or lies down the iced water will spill out of the boot. FIG. 12-14 illustrate an embodiment of a boot top closure. FIGS. 12 and 13 show a flexible closure means, 410. There are two matching pieces like the one shown. On one side there is a half of a hook and loop strap system 412. On the other side there is also a half of a hook and loop strap system 414 and 415. In FIG. 14 there are mating halves, 422 and 420, of the hook and loop straps 414. The pieces 410 are attached to the boot top straps by mating 414 and 420 and 412 of another piece with 421. The pieces can then be wrapped around the leg of an equine and secured by mating the 412 pieces. Item 415 is useful to roll back the pieces and attach 412 to 415 to hold them in the open position. Suitable flexible materials will be apparent to those skilled in the art. An ⅛ inch thick closed cell polyurethane or neoprene foam fabric is used in a prototype and works well.

Pads

Suitable shock-absorbing orthotic pads (108 in the Figures) for this invention are those generally shaped to approximate the shape of the animal's hoof-print. It has been found that the shape of the pad is important. The shape will depend on the nature of the hooves; for example, Arabian horses generally have more elongated hooves than do Quarter horses. Moreover, more elongated oval shapes are especially useful in laminitis affected horses, where the hoof is tilted downward because of the abnormal growth rates of the hoof walls caused by the compromised tubules of the laminae. Pads (and sole plates) with a relatively wide heel section allow better rocker action and better flow of coolant around the hoof.

The pad may be made of any suitable shock absorbing material such as elastomeric polymer material that provides flexibility, shock absorbency, some degree of elasticity, resilience and has dimensional stability. Polyvinyl chloride PVC, polysilicone and similar elastomers are suitable. In a preferred embodiment, the pad is constructed of a cast polyurethane elastomer. For example, polyurethane-casting elastomer having a Shore A hardness of from about 0 to about 50 is acceptable.

In most cases it is desirable that the pad be a relatively soft and deep elastomer, Shore 00 of 5 to 60, and of about 0.50 to 2.0 inches thickness. This deep soft pad is especially useful where the hoof is damaged or diseased. The soft pad will conform to the shape of the hoof and reshape itself as the horse shifts its weight since the pad is soft and pliable and constrained by the wall of the boot, e.g. the sole plate wall providing not only good support but a massaging action. The soft pads should generally extend to the edges of the inside walls of the sole plate. The pads may be single density or duel density. In a dual density pad the front and rear section will have Shore 00 hardness between 5 and 70, but will be different front and rear. For example, a duel density pad may have a front section of Shore 00 hardness of 30 and a rear section hardness of 60 Shore 00. Or, conversely, it may have a front section hardness of 50 and a rear section hardness of 20 Shore 00. The choice of hardness and the arrangement in the duel density pad is determined by the desired outcome. For example, if it is desirable to have the hoof tip or lean forward then a softer front section would be indicated. The principle importance of the soft deep pad is that it lets the horse seek the most comfortable position for the hoof and thus minimize stress and damage. Moreover, it provides additional rocker effect—the hoof can rock back and forth in the soft pad material—to allow the horse to achieve more natural balance. Coupled with a cooling boot as described above, the deep soft pad provides excellent rocker ability and has been found to be especially efficacious in horses with damaged hoofs—as with laminitis. This allows the horse to find the most comfortable and most healing position—that is, a position that minimizes damage to the hoof. The beneficial effects of a natural balance in the horse's stance are widely recognized in horse therapeutics. Suitable single and dual density pads are described and illustrated in U.S. Pat. No. 7,445,051 issued Nov. 4, 2008, U.S. Pat. No. 8,220,231, issued Jul. 17, 2012, U.S. Pat. No. D616,614 issued Jul. 22, 2014 and U.S. application Ser. no. 29/454,564 filed Mar. 10, 2013, the descriptions and Figures of which is incorporated herein by reference for all purposes. The pad may or may not be sloping towards the front.

Figure 21:
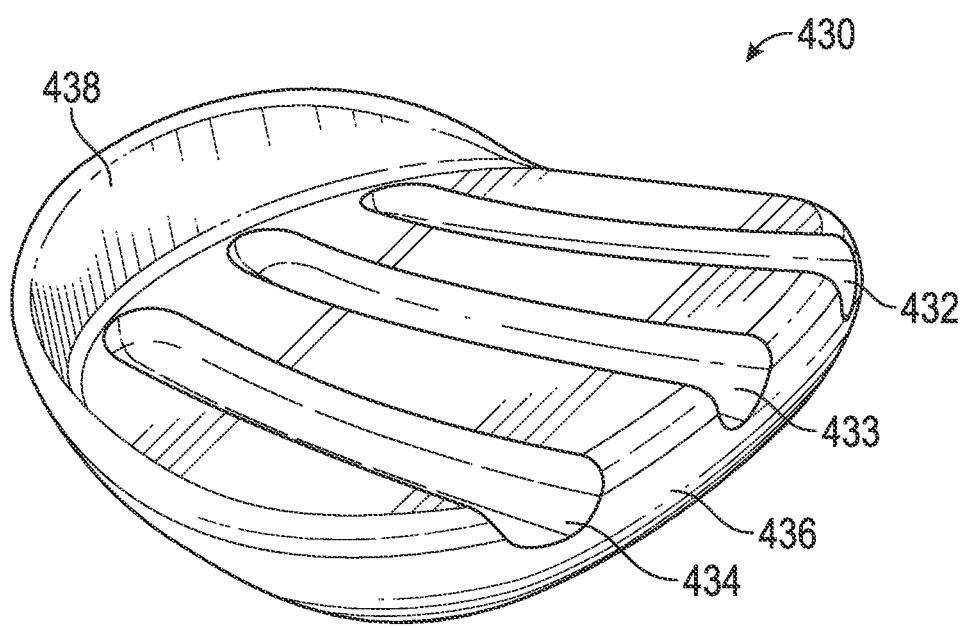
FIG. 21 is a perspective view of orthotic pad of an embodiment of the invention.

A special pad that facilitates coolant flow beneath the hoof is shown in FIG. 21. The pad, 430, has ridges 432, 434 and 436 that will allow water to flow beneath the hoof. The pad has a raised front 438 to provide a comfortable stop for the toe of the hoof. This pad is made of the same materials as described above for orthotic pads. It's ridged design facilities the flow of coolant around the hoof. As the horse shifts its weight the ridges compress and expand (but are circumferentially constrained by the walls of the sole plate) to provide a pumping action to move the coolant beneath the hoof and to help prevent stagnant warn spots of coolant.

The boot apparatus and method can be used on shod and unshod horses. It will be an advantage in some circumstances to have the hoof shod, all things being equal, since the shoe will allow coolant to contact the sole of the hoof as well as the wall. Plastic or polymer, light weight shoes that can be attached to the hoof without nails (as with an adhesive) are preferred.

In one embodiment the boot and assembly also has means to place the cooling boot under vacuum—the top of the bag or boot will be sealed around the leg. U.S. Pat. No. 8,166,734, issued May 1, 2012 illustrates a boot/boot assembly suitable for vacuum cooling. The structure, operation and advantages are described in U.S. Pat. No. 8,166,734, issued May 1, 2012, the disclosures and Figures are incorporated herein by reference.

Fitting the Boot on an Equine Leg

Figure 19:
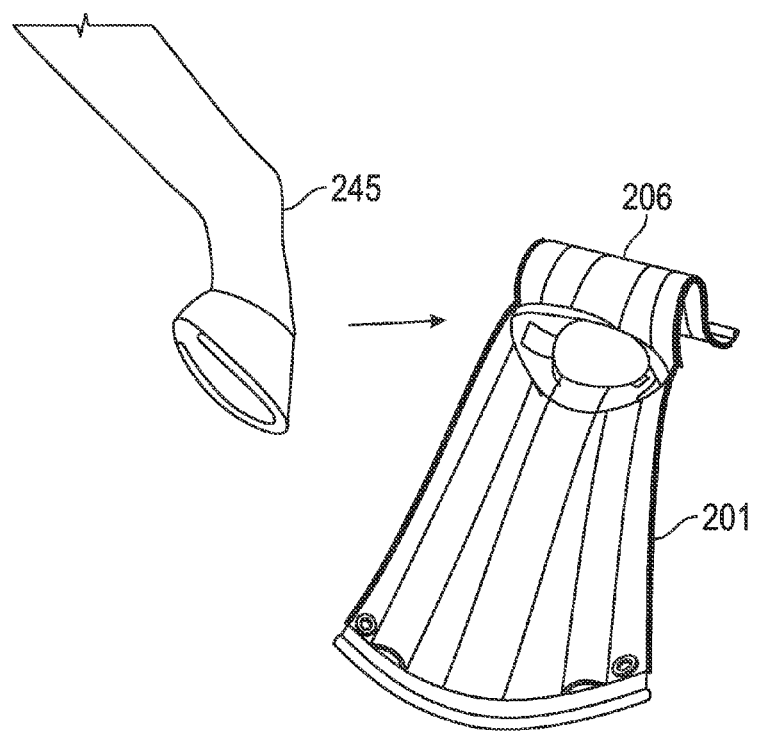
FIG. 19 is a perspective view of a boot of the invention showing the boot sides open to receive a horse's leg and hoof.
Figure 20:
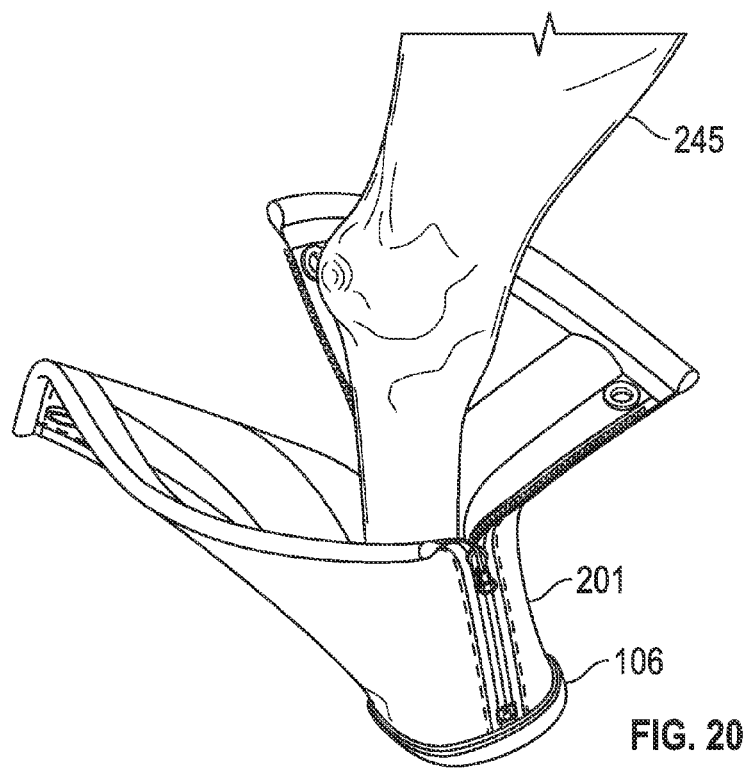
FIG. 20 is a perspective view of a boot of the invention showing a horse's led in a partially open boot.

FIGS. 19 and 20 illustrate a boot of the invention being fitted on a horse's leg. In a boot with zipper opening on the sides, the sides are open and laid back. The leg is guided into the boot and if the harness is used the leg will have the harness attached. The hook and loop straps on the harness (302) will be attached to the straps in the boot bottom (206) and adjusted and the openings closed. Similarly if there is no opening in the sides of the boot its walls may be rolled down and the harness connected as described above.

The Cooling Boot as an Ice Spa

Ice spas have become popular and a have been shown to be very beneficial in preventing and treating soreness and stress damage in equine legs. They are also very beneficial in treating laminitis.

Ice spas are characterized by a reservoir of chilled coolant (almost universally water) containing sea salt and optionally magnesium salt and which has oxygen (air) injected for oxygenating the coolant. Generally the coolant is circulated through a refrigeration unit to maintain a low temperature. Current commercial spas are large expensive walk-in units that are not mobile. See Richard Albee; *Cold Saltwater Spa—The Latest in Leg Therapy*; Equine Chronicles On Line, Nov. 6, 2009; http://equinechronicleonline.com/cold-saltwater-spa-thelatest-in-leg-therapy and Thomas; *Cold Salt-Water Spa for Horses; California Thoroughbred*, September 2008. The conditions that can be treated, the treatment parameters, the expected results and the science behind the effectiveness of cold water spa treatment are extensively documented in the literature and need not be repeated here.

The coolant boot assemblies of this invention make ideal light weight portable ice spa. The coolant boot as described in the embodiments above is fitted with an air pump (battery or power operated) to inject air through the tube 218 and valve 216 into liquid in the boot reservoir. The reservoir is partially filled with water and crushed ice and the air circulated. Sea salt is added to the coolant in the reservoir and optionally magnesium salt. Sea salts contain a number of elements other than sodium chloride that are beneficial in the spa treatment including potassium, calcium chloride and bromides. Sea salts with varying amounts of other compounds are available commercially. Magnesium salts that are soluble in water are also available. Magnesium sulfate and magnesium chloride are useful. In general it is desirable that the salt concentration be about twice that of sea water. A concentration of about 0.2 pounds per gallon of water of sea salt and 0.3 pounds of magnesium salt has been shown to be effective. Since the effectiveness of the osmotic effect of the minerals is determined by concentration (and temperature) optimum salt levels may be determined by simple experimentation. The salts may be prepackaged in the correct amount to add to a predetermined amount of water in the boot reservoir. Coolant temperatures of about 32-40° F. of are desirable. Treatments (legs in coolant) of about 20-40 minutes have been found effective. A short prototype of the boot assembly will contain about 2.25 gallons of coolant with an equine leg in the boot. A taller prototype about five (5) gallons.

Some advantages of the use of the coolant boot ice spas of this invention is that they are light weight and portable and can be used where there is no electrical power, easily cleaned and provides an orthotic hoof support not available in any current systems. The large commercial spas now available contain large amounts of water that must be reused—it is filtered for cleaning and the horses fitted with manure bags. This is expensive and likely not very effective in removing fungi and other harmful contaminants. The portable boot spa of the present invention avoids this problem. There is no need for manure bags and the water can be discarded after each use—making it very sanitary.

Method

The method of the invention comprises fitting a horse needing cryotherapy treatment and/or suffering from or in danger of the onset of laminitis on one or more hooves with cooling boot/pad/sole plate as described herein, filling the cooling boot with coolant (and replenishing the coolant as it gains temperature) for sufficient time to and temperature to effect measurable cooling of the leg and hoof. In the spa embodiments salt and optionally magnesium compounds are added to the coolant in effective amounts and air injected into the coolant liquid.

Based on a study by Dr Andrew W. van Eps, horses can withstand prolonged near freezing cold application. "When cooling the feet, the length of application time varies from case to case." When used in a sick horse for preventing laminitis, it may be applied for 3 to 7 days. In a horse that has just developed laminitis, 2 to 3 days of continuous cryotherapy may be used, provided it's not used in cases where there is infection in the foot, such as occurs with many chronically laminitic horses with concurrent foot abscesses." He adds that while those temperatures and time frames would be highly dangerous to humans, the horses seem to tolerate them quite well. "I think they're somewhat adapted, as a species, to walking around in snow and cold weather," he says. "In the horse, we can cool the foot to 41 degrees using ice water for several days without apparent adverse effects, while those same temperatures are painful for us and can actually damage our tissue." From the article by Lisa Kemp, *Stopping Laminitis Cold;* American Farriers Journal, September/October 2011; www.americanfarriers.com. This paper provides guidance for the application of cooling in this invention and its teachings are incorporated herein by reference.

In the foregoing specification, the invention has been described with reference to specific embodiments thereof. It will, however, be evident that various modifications and changes can be made thereto without departing from the broader spirit and scope of the invention as set forth in the appended claims. The specification is, accordingly, to be regarded in an illustrative rather than a restrictive sense. Therefore, the scope of the invention should be limited only by the appended claims.

The invention claimed is:

1. An equine leg and hoof cooling boot assembly comprising;
   a reservoir made of a flexible material for containing coolant having a closed bottom and open top; a shock absorbing orthotic pad disposed in the bottom of the reservoir on top of a layer of reservoir material; a sole plate having a bottom and upwardly extending side walls integral with the sole plate bottom defining an opening into which the bottom of the reservoir is disposed; and
   attachment means to attach the underside of the layer of reservoir material to the inside top side of the sole plate and attachment means to attach the orthotic pad to the inside bottom of the reservoir.

2. The assembly of a claim 1 wherein the reservoir is disposed in an equine fabric boot comprising an upper section made from fabric shaped to fit around an equine hoof and of a height to reach above the hoof of the equine, comprising an upper portion, comprising a front, sides, rear and bottom that is attached to said front, sides and rear, wherein the front slopes back and upward, the sides are separated with a slit so that when the front and rear are pulled together there is an opening on each side; a fastening means at the top front and rear to fasten the front and rear together around the leg of a equine, and said bottom is attached to the front, sides and rear, and; a molded sole plate comprising an elastomer base entirely circumscribed by a peripheral wall.

3. The assembly of claim 1 wherein the attachments of the orthotic pad to reservoir and reservoir to sole plate are provided by releasable hook and loop straps.

4. The assembly of claim 1 wherein the sole plate is semi-rigid, has a solid bottom and side walls extending completely around the circumference of the sole plate wherein the sole plate and orthotic pad are sized and configured to substantially restrain lateral expansion of the pad when place under pressure.

5. The assembly of claim 1 comprising means to secure the top of the reservoir around an equine leg and means to sufficient to allow the the reservoir to hold a vacuum.

6. The assembly of claim 1 wherein the orthotic pad is at least ½ inch thick, and has a Shore A hardness of about 10 to 40.

7. The assembly of claim 1 wherein the reservoir also comprises a drain located in the wall of the reservoir communicating with the reservoir and outside the reservoir to allow liquid to be removed from the cooling boot assembly.

8. The assembly of claim 1 wherein the sole palate has at bottom and upward extending walls with an inside and outside surfaces wherein the lower sides of the reservoir are attached to the inside surface of the walls of a sole plate.

9. The assembly of claim 1 wherein the elastomeric orthotic pad has a top and bottom side and has at least three grooves on the top side extending from front to back.

10. The assembly of claim 1 wherein the reservoir is a waterproof fabric boot.

11. The assembly of claim 10 comprising at least one waterproof zipper in the side of the boot extending from the top downward.

12. The assembly of claim 1 comprising at least one elongated batten pocket sized to house a straight batten, said batten comprising a rigid narrow strip of material on the inside wall of the boot.

13. The assembly of claim 1 comprising means to removably secure the bottom of the boot to an equine leg comprising a fabric collar that is configured to releasably surround an equine leg below the knee and above the coronet band and that has hook and loop straps and matching hook and loop straps attached to the inside circumference in the lower section of the reservoir structure.

14. The assembly of claim 10 comprising boot sides and bottom of water retaining fabric, a sole plate that is semi-rigid and has a solid bottom and side walls extending entirely around the circumference of the sole plate and has at least one zipper and at least one batten pocket extending from the top of the boot downward and means to releasably secure an elastomeric orthotic pad to the bottom of the boot.

15. An ice spa assembly comprising a reservoir made of a flexible material for containing coolant having: a closed bottom and open top;
   a shock absorbing orthotic pad disposed on top of a layer of reservoir material in the bottom of the reservoir;
   a sole plate having a solid bottom and side walls, defining a bowl shaped structure into which the bottom of the reservoir is attached;

attachment means to attach the underside of the reservoir to the inside top side of the sole plate and attachment means to attach the orthotic pad to the inside bottom of the reservoir;

and means for injection gas into the lower section of reservoir.

16. The spa assembly of claim 15 wherein the reservoir is a boot and comprising at least one waterproof zipper in the walls of the boot extending from the top downward over substantially the entire length of the reservoir.

17. The spa assembly of claim 16 wherein the reservoir is a boot comprising sides and bottom of water retaining fabric, a sole plate that is semi-rigid and has a solid bottom and side walls extending entirely around the circumference of the sole plate and has at least one zipper and at least one batten pocket extending from the top of the boot downward and means to removably secure an elastomeric pad to the bottom of the boot on top of a layer of water retaining fabric.

18. A method of treatment of equine hooves and legs needing treatment comprising fitting an equine animal that will benefit from cryotherapy treatment into a spa assembly, filling a spa assembly with coolant for sufficient time and at a temperature to effect measurable cooling of the leg and hoof wherein the spa assembly comprises:

a reservoir made of a flexible material for containing coolant having:

a closed bottom and open top;

a shock absorbing orthotic pad disposed on top of a layer of reservoir material in the bottom of the reservoir;

a sole plate having an entire bottom and side walls, into which the bottom of the reservoir is attached; and attachment means to attach the underside of the reservoir to the inside top side of the sole plate and attachment means to attach the orthotic pad to the inside bottom of the reservoir;

means for injecting air into the lower section of the reservoir.

19. The method of claim 18 wherein salt selected from the group consisting of sea salt and magnesium salt or both is added to the coolant, air is circulated into the coolant in the lower portion of the assembly reservoir.

* * * * *